(12) United States Patent
Skelley (10) Patent No.: US 11,584,287 B2
(45) Date of Patent: Feb. 21, 2023

(54) SUSPENSION AND HUB ENGAGEMENT TOWING FACILITATING ASSEMBLY

(71) Applicant: Matthew Skelley, Belle Plaine, MN (US)

(72) Inventor: Matthew Skelley, Belle Plaine, MN (US)

( * ) Notice: Subject to any disclaimer, the term of this patent is extended or adjusted under 35 U.S.C. 154(b) by 375 days.

(21) Appl. No.: 16/890,407

(22) Filed: Jun. 2, 2020

(65) Prior Publication Data

US 2021/0370819 A1 Dec. 2, 2021

(51) Int. Cl.
*B60P 3/075* (2006.01)
*B60P 3/12* (2006.01)

(52) U.S. Cl.
CPC ............... *B60P 3/075* (2013.01); *B60P 3/125* (2013.01)

(58) Field of Classification Search
CPC B60P 3/075; B60P 3/077; B60P 3/073; B60P 3/125
USPC .......... 410/19; 414/426, 429, 463, 464, 465, 414/466, 563
See application file for complete search history.

(56) References Cited

U.S. PATENT DOCUMENTS

| | | | |
|---|---|---|---|
| 1,650,031 A | 12/1925 | Nash | |
| 3,756,616 A * | 9/1973 | Sapp, Sr. | B60S 13/00 248/352 |
| 4,596,506 A | 6/1986 | Burgardt | |
| 4,968,052 A | 11/1990 | Alm | |
| 5,180,177 A | 1/1993 | Maki | |
| 5,181,821 A | 1/1993 | King, Sr. | |
| 5,454,672 A | 10/1995 | Halpin | |
| 6,279,950 B1 | 8/2001 | Armstrong | |
| 7,153,082 B2 | 12/2006 | Nolasco | |
| 7,325,814 B2 * | 2/2008 | Sparacino | B62B 1/14 280/47.131 |
| 7,918,637 B2 | 4/2011 | Wolderman | |
| 7,988,402 B2 | 8/2011 | Adams | |
| 8,337,135 B2 * | 12/2012 | Underwood | B60P 3/125 414/815 |
| 10,035,445 B2 | 7/2018 | Sharp | |
| 2007/0138112 A1 * | 6/2007 | Meyer | B66F 7/243 211/24 |
| 2008/0060886 A1 * | 3/2008 | Erghott | B60P 3/077 188/32 |

FOREIGN PATENT DOCUMENTS

WO 9523716 3/1994

* cited by examiner

*Primary Examiner* — Glenn F Myers (57) ABSTRACT

A suspension and hub engagement towing facilitating assembly includes a receiver having a top side that removably receives a hub of a vehicle. A pair of catches is attached to the receiver at opposite ends thereof. The catches releasably receive tow bars such that the receiver is positioned between and liftable with the tow bars.

20 Claims, 6 Drawing Sheets

SUSPENSION AND HUB ENGAGEMENT TOWING FACILITATING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheel-less hub gripping device and more particularly pertains to a new wheel-less hub gripping device for engaging a hub of a vehicle, when the wheel has released from the hub, such that the hub can be lifted by a conventional towing apparatus in a safe and stable manner.

(2) Description of Related Art Including Information Disclosed Under 37 CFR 1.97 and 1.98

The prior art relates to devices for gripping wheels and hubs so that a vehicle can be moved by a tow truck. However, the prior art does not include adequate devices that can grip a hub when a wheel has come off of the hub such as during an accident. Current towing apparatuses cannot safely hold onto a hub while the vehicle is being moved and ensure that the hub will not slip out of the towing apparatus and injure an operator.

BRIEF SUMMARY OF THE INVENTION

An embodiment of the disclosure meets the needs presented above by generally comprising a receiver having a top side configured to removably receive a hub of a vehicle. A pair of catches is attached to the receiver at opposite ends thereof. The catches are configured to releasably receive tow bars such that the receiver is positioned between the tow bars and can be lifted by the tow bars.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new wheel-less hub gripping device embodying the principles and concepts of an embodiment of the disclosure and generally designated by the reference numeral 10 will be described.

As best illustrated in FIGS. 1 through 7, the suspension and hub engagement towing facilitating assembly 10 generally comprises a receiver 12 having a top side 14 configured to removably receive a hub 16, wherein the hub 16 is wheel-less or, that is, no longer has a tire positioned on the hub 16. This may happen where a vehicle (not shown) is being driven and through some mechanical failure or error the tire comes off of the hub 16. This can also happen, for example, during a vehicle accident. Under such circumstances a conventional towing vehicle having a T-bar 18 and pivoting L-bar 20 cannot easily grip the hub 16 in the same manner that they would a tire. The receiver 12 receives the hub 16 such that the hub 16 is cradled and thereafter can be gripped by the tow bars 18, 20.

The receiver 12 more particularly includes a first outer wall 22 and a second outer wall 24 each having an upper edge 26, a lower edge 28, a first end edge 30 and a second end edge 32. The first 22 and second 24 outer walls are essentially mirror images of each other. Each of the first 22 and second 24 outer walls has an inner surface 34 and an outer surface 36 wherein the inner surface 34 of the first outer wall 22 faces the inner surface 34 of the second outer wall 24. An open space 38 extends downwardly between the first 22 and second 24 outer walls. The open space 38 is configured to receive the hub 16 such that a portion of the hub 16 abuts the upper edges 26 of the first 22 and second 24 outer walls.

Figure 1:
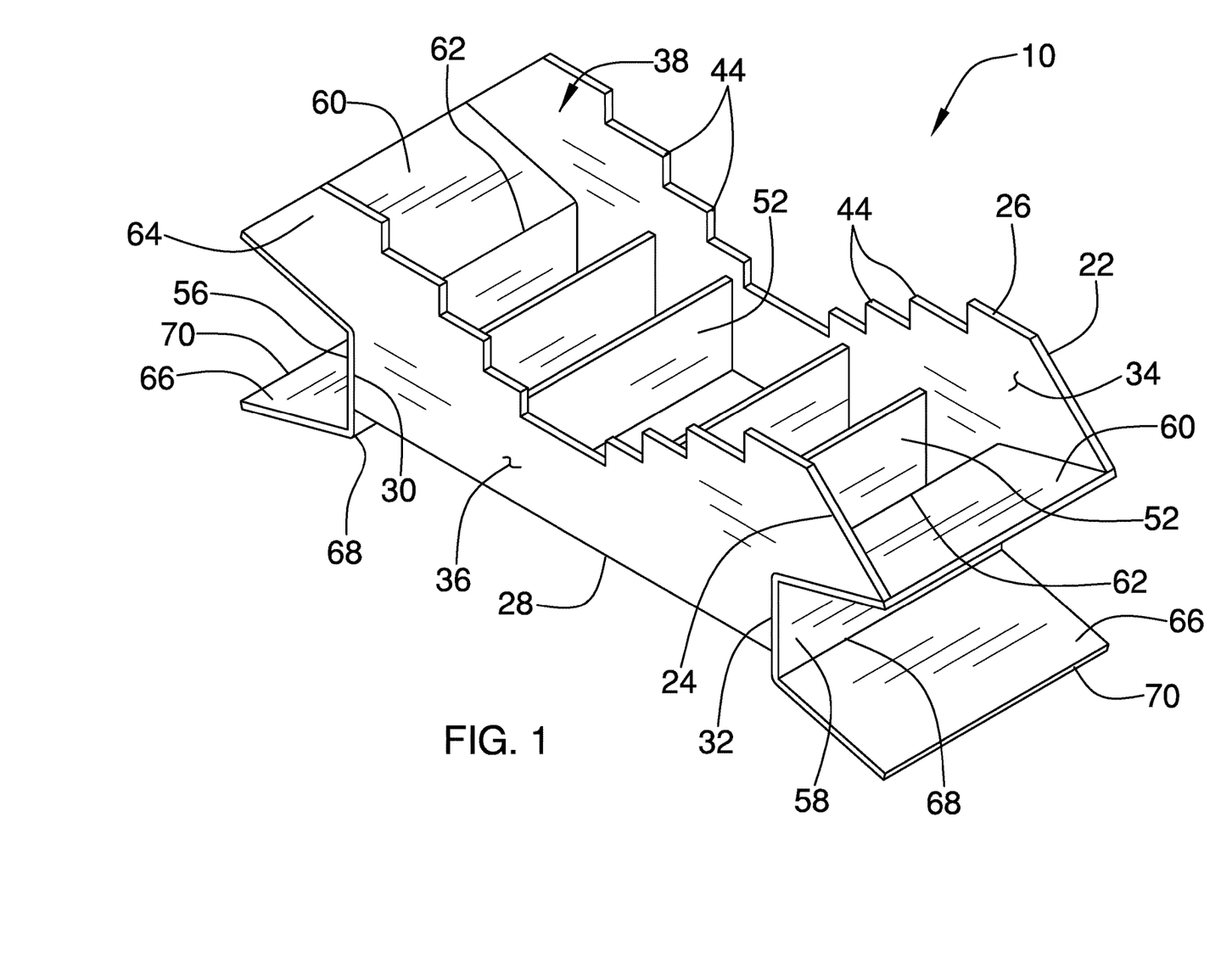
FIG. 1 is a top isometric view of a suspension and hub engagement towing facilitating assembly according to an embodiment of the disclosure.
Figure 2:
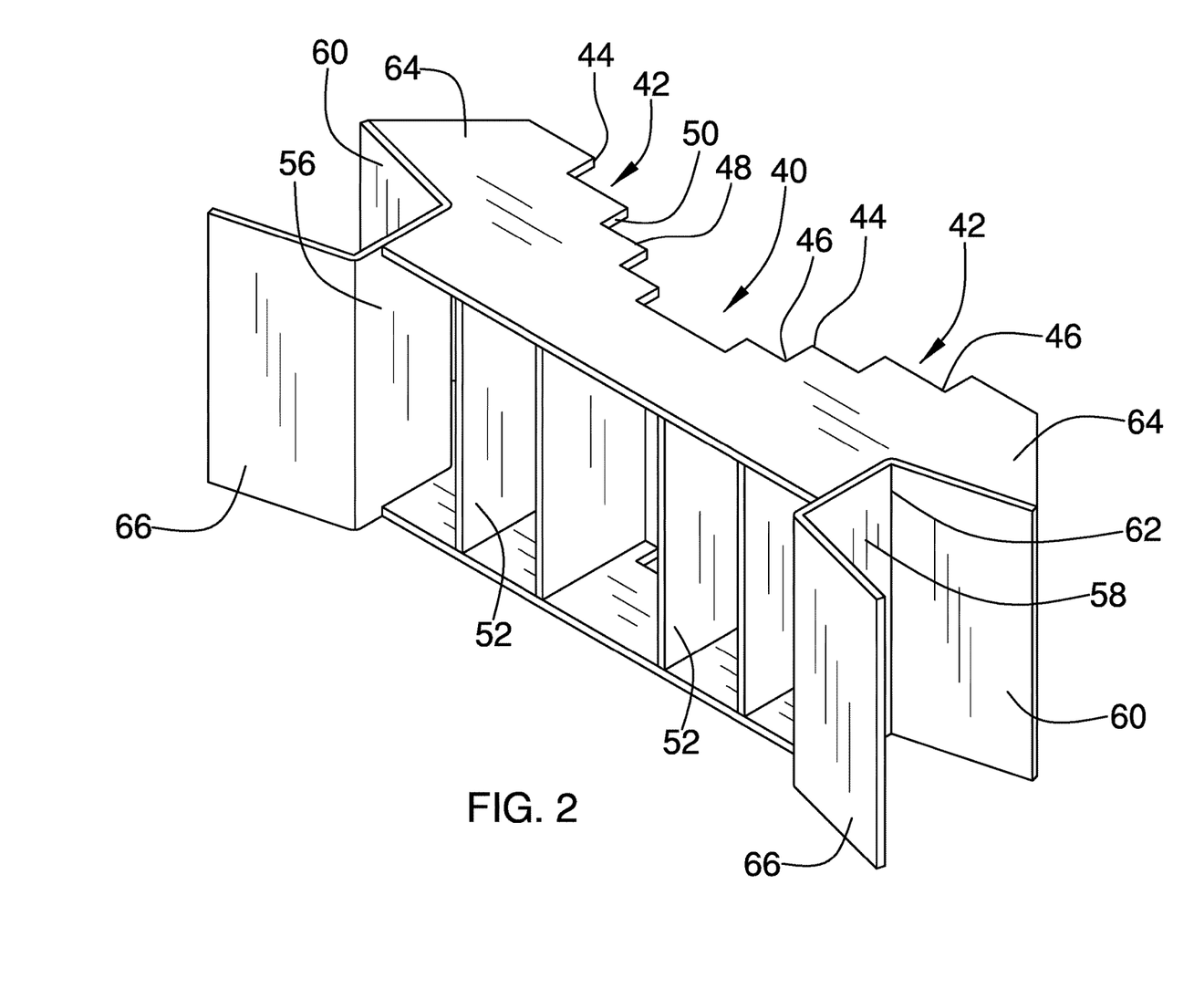
FIG. 2 is a bottom isometric view of an embodiment of the disclosure.
Figure 3:
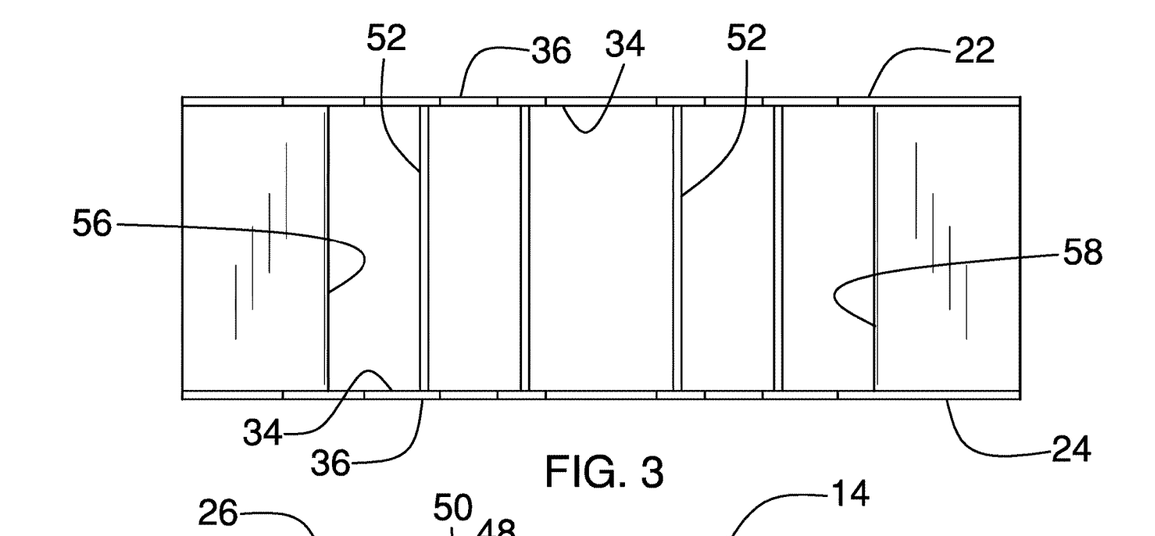
FIG. 3 is a top view of an embodiment of the disclosure.
Figure 4:
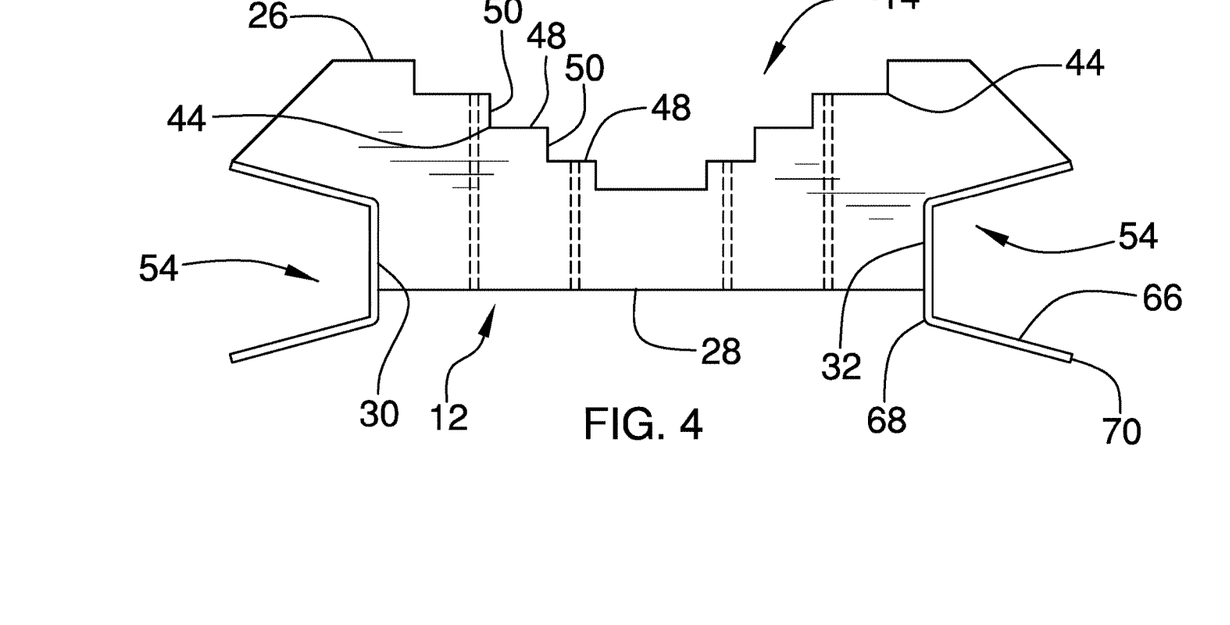
FIG. 4 is a side view of an embodiment of the disclosure.
Figure 5:
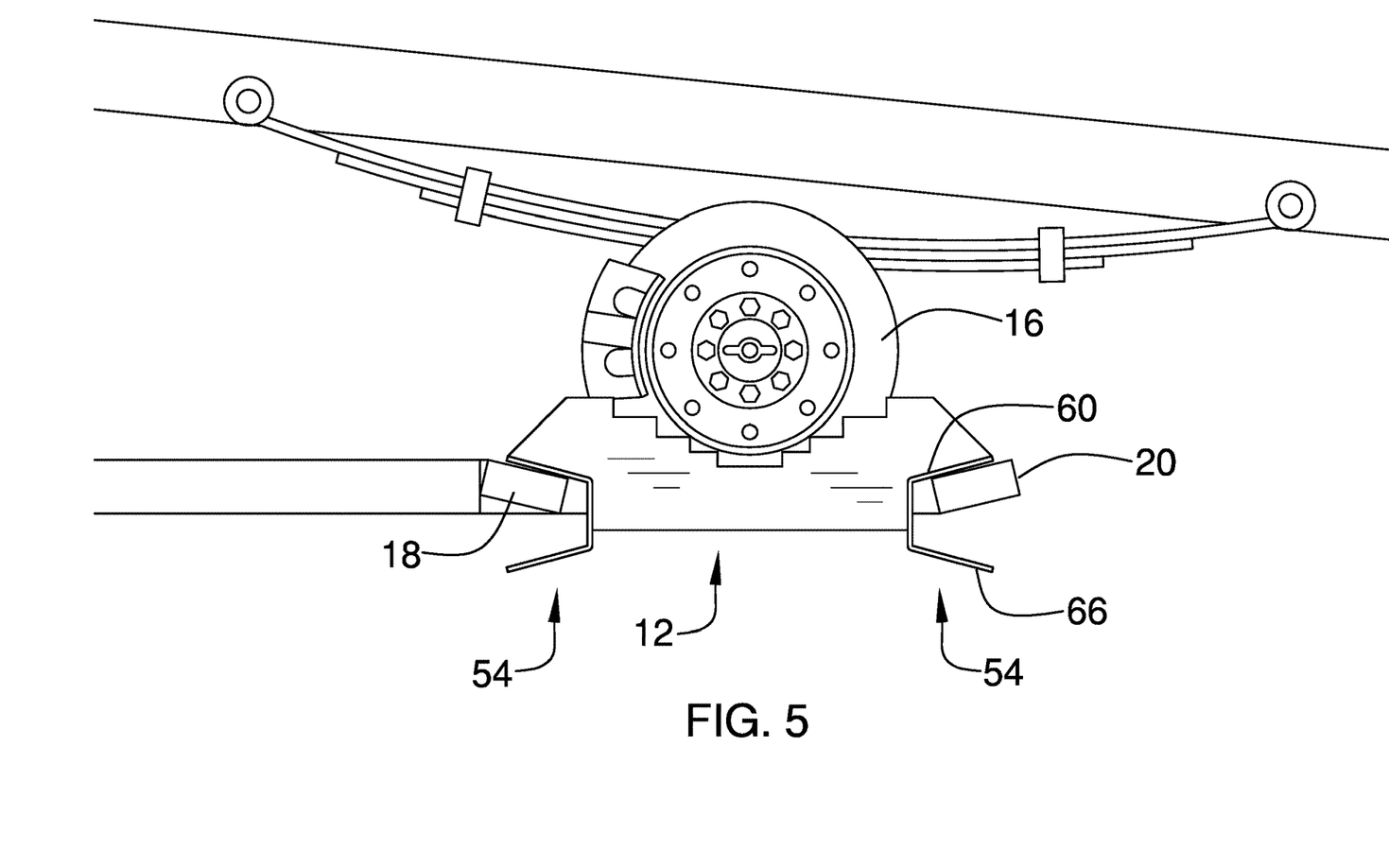
FIG. 5 is a side in-use view of an embodiment of the disclosure.
Figure 6:
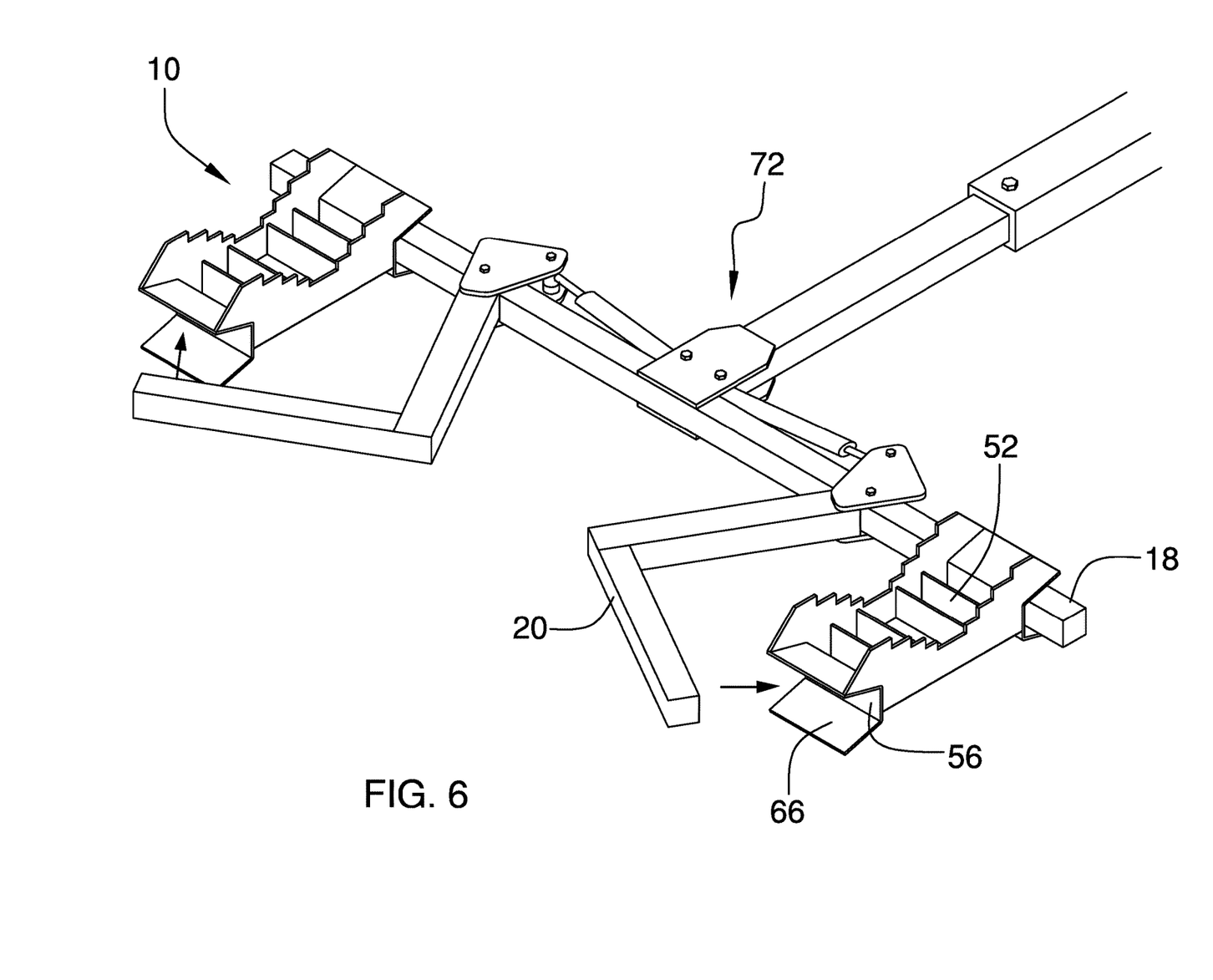
FIG. 6 is a top isometric in-use view of an embodiment of the disclosure.
Figure 7:
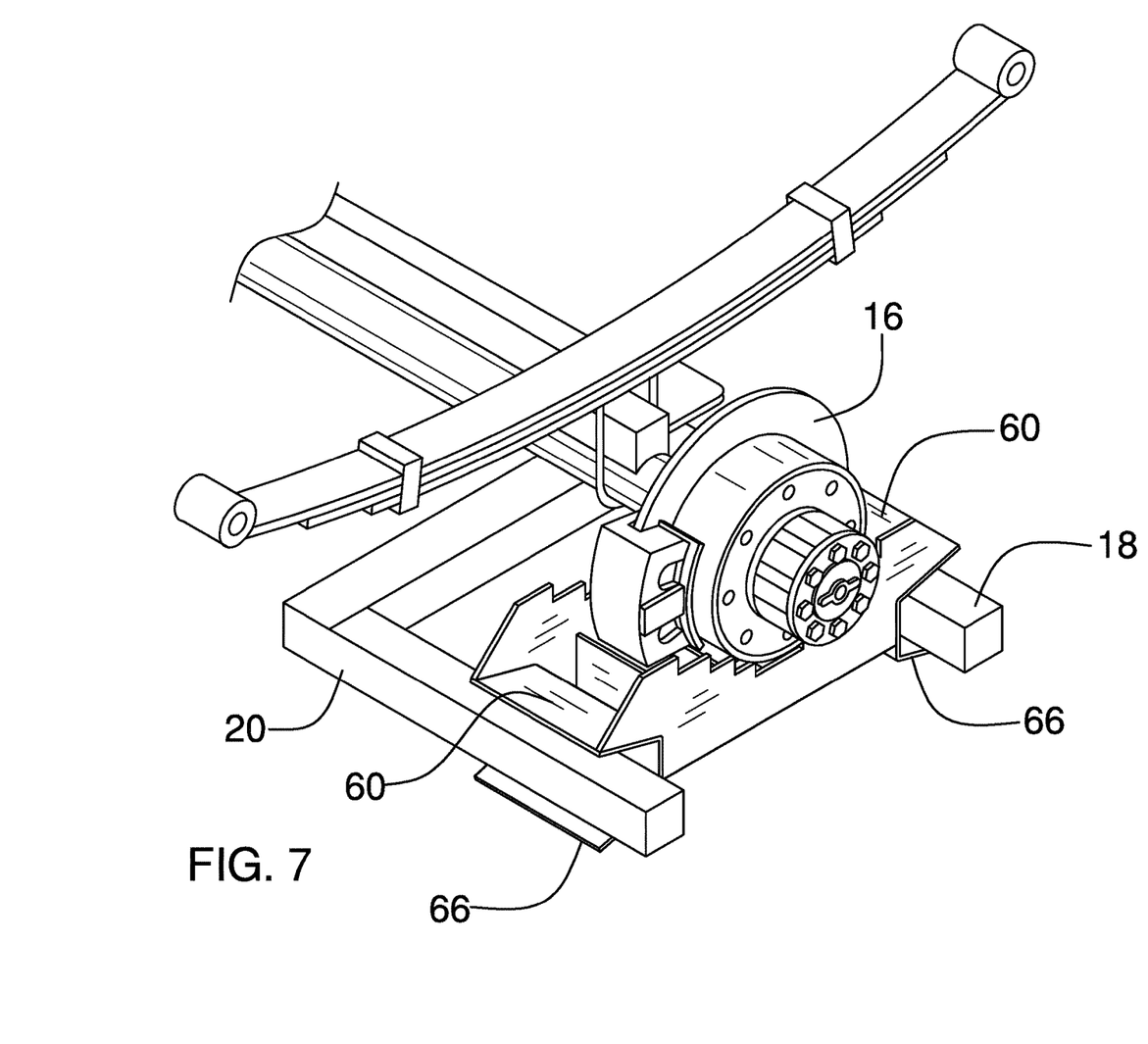
FIG. 7 is a top isometric in-use view of an embodiment of the disclosure.

The upper edges 26 of the first 22 and second 24 outer walls are laterally aligned with each other. As shown in FIG. 2, the upper edges 26 of the first 22 and second 24 outer walls each have a central section 40 positioned between a pair of outer sections 42. The central sections 40 are positioned lower than associated ones of the outer sections 42 to retain the hub 16 between outer ends of the receiver 12. Teeth 44 are positioned in the upper edges 26. This may be accomplished by each of the outer sections 42 include a plurality of steps 46 extending downwardly toward an associated one of the central sections 40. Each of the steps 46 includes a horizontally orientated run 48 and a vertically orientated rise 50 to form the teeth 44 in the upper edges 26 to engage the hub 16.

A plurality of stabilizing walls 52 is attached to and extends between the inner surfaces 34 of the first 22 and second 24 outer walls. The stabilizing walls 52 each will typically have a length from the first outer wall 22 to the second outer wall 24 between 5.0 inches and 12.0 inches. The stabilizing walls 52, and first 22 and second 24 outer walls are each comprised of a rigid, high strength materials such as metals including steel, aluminum alloys and the like.

A pair of catches 54 is attached to the receiver 12 at opposite ends thereof. The catches 54 are configured to releasably receive tow bars such that the receiver 12 is positioned between the tow bars. More particularly, once the hub 16 is placed in the receiver 12, the T-bar 18 engages one of the catches 54 and the L-bar 20 is closed around the receiver 12 to engage the other one of the catches 54. The T-bar 18 and L-bar 20 are of a conventional towing structure and are biased toward each other such as by hydraulic or pneumatic pistons, electric motors, chains or the like. As they are biased toward each other, they are typically used to engage a tire, though in the present case the T-bar 18 and L-bar 20 instead engage the catches as a hub 16 cannot be easily gripped by the T-bar 18 and L-bar 20.

The catches 54 include a pair of end walls 56, 58. One of the end walls 56, 58 is attached to one end of the receiver 12 and one of the end walls 56, 58 is attached to another end of the receiver 12. The end walls 56, 58 each extend between and are attached to the first 22 and second 24 outer walls. The end walls 56, 58 are spaced from each other a distance of between 8.0 inches and 24.0 inches. The pair of end walls includes a first end wall 56 positioned adjacent to respective ones of the first end edges 30 and a second end wall 58 positioned adjacent to respective ones of the second end edges 32. Each of the end walls 56, 58 will typically be vertically orientated.

A pair of top walls 60 is provided and each of the end walls 56, 58 has a top edge 62 having one of the top walls 60 attached thereto such that the top walls 60 are coextensive with a corresponding one of the top edges 62. An angle between the end walls 56, 58 and an attached one of the top walls 60 is between 90° and 120° such that the top walls 60 are angled upwardly from an adjacent one of the end walls 56, 58. This allows the T-bar 18 and L-bar 20 to easily extend under the top walls 60 and then lift upwardly against the top walls 60. Buttresses 64 may extend along outer edges of the top walls 60 and be integral with the first 22 and second 24 outer walls to reinforce the top walls 60 relative to the receiver 12.

A pair of bottom walls 66 is provided. Each of the end walls 56, 58 has a bottom edge 68 having one of the bottom walls 66 attached thereto such that the bottom walls 66 are coextensive with a corresponding one of the bottom edges 68. An angle between the end walls 56, 58 and an attached one of the bottom walls 66 is between 90° and 120° such that the bottom walls 66 are angled downwardly from an adjacent one of the end walls 56, 58. The bottom walls 66 each have a distal edge 70 with respect to the receiver 12 that is positioned lower than the receiver 12 and therefore extend below a plane of the lower edges 12 of the first 22 and second 24 outer walls. The distal edges 70 are horizontally orientated and form feet of the assembly 10 to retain the assembly 10 in a stabilized position.

In use, when a vehicle has lost its tire and a towing apparatus 72 cannot readily grip the hub 16, the assembly 10 is placed under the hub 16 such that the hub 16 extends into the receiver 12 and abuts the upper edges 26 thereof. The hub 16, which may include a portion of the attached suspension, is placed in in the central section 40 to prevent its movement forward or rearward within the receiver 12. The T-bar 18 and L-bar 20 are then positioned to extend around the assembly 10 such that the catches 54 are engaged to allow towing apparatus to lift and move the vehicle as needed. In this manner the assembly 10 facilitates the movement of the vehicle in a safe and secure manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hub engaging assembly configured to releasably receive a tireless hub such that the hub is graspable with a T-bar and attached L-bar, the assembly comprising:
   a receiver having a top side configured to removably receive the hub, wherein the receiver includes a first outer wall and a second outer wall each having an upper edge, a lower edge, a first end edge and a second end edge, each of the first and second outer wall having an inner surface and an outer surface wherein the inner surface of the first outer wall faces the inner surface of the second outer wall, an open space extending downwardly between the first and second outer walls, the open space being configured to receive the hub such that a portion of the hub abuts the upper edges of the first and second outer walls, wherein the upper edges of the first and second outer walls are laterally aligned with each other, wherein the upper edges of the first and second outer walls each have a central section positioned between a pair of outer sections, the central sections being positioned lower than associated ones of the outer sections, wherein each of the outer sections includes a plurality of steps extending downwardly toward an associated one of the central sections, each of the steps including a horizontally orientated run and a vertically orientated rise to form teeth in the upper edges to engage the hub; and
a pair of catches being attached to the receiver at opposite ends thereof, the catches being configured to releasably receive tow bars such that the receiver is positioned between the tow bars.

2. The hub engaging assembly according to claim 1, wherein the receiver includes a plurality of stabilizing walls being attached to and extending between the inner surfaces of the first and second outer walls.

3. The hub engaging assembly according to claim 1, wherein the catches comprise:
a pair of end walls, one of the end walls being attached to one end of the receiver and one of the end walls being attached to another end of the receiver; and
a pair of top walls, each of the end walls having a top edge having one of the top walls being attached thereto such that the top walls are coextensive with a corresponding one of the top edges.

4. The hub engaging assembly according to claim 3, wherein an angle between the end walls and an attached one of the top walls is between 90° and 120° such that the top walls are angled upwardly from an adjacent one of the end walls.

5. The hub engaging assembly according to claim 4, further including a pair of bottom walls, each of the end walls having a bottom edge having one of the bottom walls attached thereto such that the bottom walls are coextensive with a corresponding one of the bottom edges.

6. The hub engaging assembly according to claim 5, wherein an angle between the end walls and an attached one of the bottom is being between 90° and 120° such that the bottom walls are angled downwardly from an adjacent one of the end walls.

7. The hub engaging assembly according to claim 4, wherein the end walls are spaced from each other a distance of between 8.0 inches and 24.0 inches.

8. The hub engaging assembly according to claim 5, wherein the bottom walls each have a distal edge with respect to the receiver being positioned lower than a lowermost point of the receiver.

9. The hub engaging assembly according to claim 1, wherein the catches comprise:
a pair of end walls, one of the end walls being attached to one end of the receiver and one of the end walls being attached to another end of the receiver; and
a pair of top walls, each of the end walls having a top edge having one of the top walls being attached thereto such that the top walls are coextensive with a corresponding one of the top edges.

10. The hub engaging assembly according to claim 9, wherein an angle between the end walls and an attached one of the top walls is between 90° and 120° such that the top walls are angled upwardly from an adjacent one of the end walls.

11. The hub engaging assembly according to claim 10, further including a pair of bottom walls, each of the end walls having a bottom edge having one of the bottom walls attached thereto such that the bottom walls are coextensive with a corresponding one of the bottom edges.

12. The hub engaging assembly according to claim 11, wherein an angle between the end walls and an attached one of the bottom is being between 90° and 120° such that the bottom walls are angled downwardly from an adjacent one of the end walls.

13. The hub engaging assembly according to claim 9, wherein the end walls are spaced from each other a distance of between 8.0 inches and 24.0 inches.

14. The hub engaging assembly according to claim 12, wherein the end walls each extend between and are attached to the first and second outer walls, the pair of end walls including a first end wall being positioned adjacent to respective ones of the first end edges and a second end wall being positioned adjacent to respective ones of the second end edges, each of the end walls being vertically orientated.

15. The hub engaging assembly according to claim 14, wherein the bottom walls each have a distal edge with respect to the receiver being positioned lower than lower edges of the first and second outer walls.

16. A hub engaging assembly configured to releasably receive a tireless hub such that the hub is graspable with a T-bar and attached L-bar, the assembly comprising:
a receiver having a top side configured to removably receive the hub, the receiver including:
a first outer wall and a second outer wall each having an upper edge, a lower edge, a first end edge and a second end edge, each of the first and second outer wall having an inner surface and an outer surface wherein the inner surface of the first outer wall faces the inner surface of the second outer wall, an open space extending downwardly between the first and second outer walls, the open space being configured to receive the hub such that a portion of the hub abuts the upper edges of the first and second outer walls;
the upper edges of the first and second outer walls being laterally aligned with each other,
the upper edges of the first and second outer walls each having a central section positioned between a pair of outer sections, the central sections being positioned lower than associated ones of the outer sections, each of the outer sections including a plurality of steps extending downwardly toward an associated one of the central sections, each of the steps including a horizontally orientated run and a vertically orientated rise to form teeth in the upper edges to engage the hub;
a plurality of stabilizing walls being attached to and extending between the inner surfaces of the first and second outer walls;
a pair of catches being attached to the receiver at opposite ends thereof, the catches being configured to releasably receive tow bars such that the receiver is positioned between the tow bars, the catches comprising:
a pair of end walls, one of the end walls being attached to one end of the receiver and one of the end walls being attached to another end of the receiver, the end walls each extending between and being attached to the first and second outer walls, the end walls being spaced from each other a distance of between 8.0 inches and 24.0 inches, the pair of end walls including a first end wall being positioned adjacent to respective ones of the first end edges and a second end wall being positioned adjacent to respective ones of the second end edges, each of the end walls being vertically orientated;
a pair of top walls, each of the end walls having a top edge having one of the top walls being attached thereto such that the top walls are coextensive with a corresponding one of the top edges, an angle between the end walls and an attached one of the top walls being between 90° and 120° such that the top walls are angled upwardly from an adjacent one of the end walls; and a pair of bottom walls, each of the end walls having a bottom edge having one of the bottom walls attached thereto such that the bottom walls are coextensive with a corresponding one of the bottom edges, an angle between the end walls and an attached one of the bottom walls being between 90° and 120° such that the bottom walls are angled downwardly from an adjacent one of the end walls, the bottom walls each having a distal edge with respect to the receiver being positioned lower than lower edges of the first and second outer walls.

17. A hub engaging assembly configured to releasably receive a tireless hub such that the hub is graspable with a T-bar and attached L-bar, the assembly comprising:

a receiver having a top side configured to removably receive the hub; and a pair of catches being attached to the receiver at opposite ends thereof, the catches being configured to releasably receive tow bars such that the receiver is positioned between the tow bars, wherein the catches comprise:

a pair of end walls, one of the end walls being attached to one end of the receiver and one of the end walls being attached to another end of the receiver;

a pair of top walls, each of the end walls having a top edge having one of the top walls being attached thereto such that the top walls are coextensive with a corresponding one of the top edges, wherein an angle between the end walls and an attached one of the top walls is between 90° and 120° such that the top walls are angled upwardly from an adjacent one of the end walls; and a pair of bottom walls, each of the end walls having a bottom edge having one of the bottom walls attached thereto such that the bottom walls are coextensive with a corresponding one of the bottom edges.

18. The hub engaging assembly according to claim 17, wherein an angle between the end walls and an attached one of the bottom is being between 90° and 120° such that the bottom walls are angled downwardly from an adjacent one of the end walls.

19. The hub engaging assembly according to claim 17, wherein the end walls are spaced from each other a distance of between 8.0 inches and 24.0 inches.

20. The hub engaging assembly according to claim 17, wherein the bottom walls each have a distal edge with respect to the receiver being positioned lower than a lowermost point of the receiver.

\* \* \* \* \*